(12) United States Patent
Ziche et al.

(10) Patent No.: US 7,737,242 B2
(45) Date of Patent: Jun. 15, 2010

(54) CROSSLINKABLE SILOXANE UREA COPOLYMERS

(75) Inventors: Wolfgang Ziche, Burghausen (DE); Oliver Schaefer, Burghausen (DE)

(73) Assignee: Wacker Chemie AG, Munich (DE)

( * ) Notice: Subject to any disclaimer, the term of this patent is extended or adjusted under 35 U.S.C. 154(b) by 462 days.

(21) Appl. No.: 11/574,084

(22) PCT Filed: Aug. 18, 2005

(86) PCT No.: PCT/EP2005/008966

§ 371 (c)(1),
(2), (4) Date: Feb. 22, 2007

(87) PCT Pub. No.: WO2006/021371

PCT Pub. Date: Mar. 2, 2006

(65) Prior Publication Data

US 2007/0232772 A1  Oct. 4, 2007

(30) Foreign Application Priority Data

Aug. 26, 2004  (DE) ................ 10 2004 041 379

(51) Int. Cl.
*C08G 77/04* (2006.01)
(52) U.S. Cl. .................. 528/28; 528/26; 528/75
(58) Field of Classification Search .......... 528/28
See application file for complete search history.

(56) References Cited

U.S. PATENT DOCUMENTS

| 5,053,316 A | 10/1991 | Suzuki et al. |
| 5,214,119 A | 5/1993 | Leihr et al. |
| 5,221,724 A * | 6/1993 | Li et al. ............ 528/28 |
| 5,237,082 A * | 8/1993 | Leir et al. ............ 556/413 |
| 5,461,134 A | 10/1995 | Leir et al. |
| 5,635,544 A | 6/1997 | Tamura et al. |
| 6,326,126 B1 | 12/2001 | Gries et al. |
| 6,355,759 B1 | 3/2002 | Sherman et al. |
| 6,750,309 B1 | 6/2004 | Chu et al. |
| 2001/0037008 A1 | 11/2001 | Sherman et al. |
| 2002/0028901 A1 | 3/2002 | Gunatillake et al. |
| 2002/0161114 A1 | 10/2002 | Gunatillake et al. |
| 2004/0087752 A1 | 5/2004 | Schindler et al. |
| 2004/0210024 A1 | 10/2004 | Schafer et al. |
| 2006/0036055 A1 | 2/2006 | Schafer et al. |
| 2006/0194937 A1 | 8/2006 | Schafer et al. |
| 2009/0143496 A1 * | 6/2009 | Ziche ............ 522/148 |

FOREIGN PATENT DOCUMENTS

| CN | 1181764 A | 5/1998 |
| CN | 1186505 A | 7/1998 |
| CN | 1498239 A | 5/2004 |
| CN | 1764684 A | 4/2006 |
| CN | 1764685 A | 4/2006 |
| DE | 4211391 A1 | 10/1993 |
| JP | 2002037842 A | 2/2002 |
| KR | 2007-0036796 | 4/2007 |
| WO | 03014194 A1 | 2/2003 |
| WO | 2006/010486 A1 | 2/2006 |

OTHER PUBLICATIONS

WO 2006/010486 A1 is corresponding to KR 2007-0036796.
U.S. 6,326,126 B1 is corresponding to DE 42 11 391 A1.

* cited by examiner

*Primary Examiner*—Randy Gulakowski
*Assistant Examiner*—Lindsay Nelson
(74) *Attorney, Agent, or Firm*—Brooks Kushman P.C.

(57) ABSTRACT

Crosslinkable polymers containing organopolysiloxane, polyurea, and/or polyurethane moieties further contain at least one photopolymerizable ethylenically unsaturated group and a photoinitiator which allows crosslinking upon exposure to radiation.

13 Claims, No Drawings

CROSSLINKABLE SILOXANE UREA COPOLYMERS

CROSS-REFERENCE TO RELATED APPLICATION

This application is the U.S. national phase of PCT Appln. No. PCT/EP2005/008966 filed Aug. 18, 2005 which claims priority to German application 10 2004 041 379.7 filed Aug. 26, 2004.

BACKGROUND OF THE INVENTION

1. Field of the Invention

The invention relates to radiation-crosslinkable organopolysiloxane-polyurea block copolymers, to processes for preparing them, and to their use.

2. Description of the Related Art

Organopolysiloxane-polyurea block copolymers are known, and can be prepared, for example, from aminoalkyl-terminated siloxanes and diisocyanates.

The formation of hydrogen bonds between the urea groups allow such polymers to be thermoplastic elastomers; in other words, they are plastic above the softening point, while below it they have elastic properties. Hence they can be used, for example, as hotmelt adhesives. A disadvantage is that the adhesive bond is reversible by an increase in temperature beyond the softening point. Moreover, moldings or adhesive bonds produced from such polymers are subject to cold flow, because even below the softening point hydrogen bonds are able continually to separate and reattach, so that deformation and hence failure are real possibilities. Accordingly, use is limited to applications where no heightened temperatures and/or forces act on the thermoplastic elastomer.

One solution to the problem is to crosslink the individual polymer chains additionally with covalent bonds, i.e., thermally irreversible bonds. If, in production, the thermoplastic elastomers are crosslinked through the use, for example, of trifunctional units, the processing properties (e.g., melt viscosity) are adversely affected. Crosslinking after application is therefore more sensible. Light-curable elastomers are known and are described for example in DE-A 42 11 391. Photocurable liquid silicone compositions are described for example in U.S. Pat. No. 5,635,544. Light-sensitive thermoplastic compositions are described in U.S. Pat. No. 5,053,316.

SUMMARY OF THE INVENTION

Organopolysiloxane-polyurea block polymers are prepared containing at least one substitute which is a radiation-curable unsaturated moiety. The polymers are easily crosslinked under the influence of, e.g., ultraviolet light.

The invention provides copolymers of the general formula $$R'\text{-}[(A)_a(B)_b(C)_c]\text{--}R'' \qquad (I),$$

in which (A) can be alike or different and is a unit of the formula (II)

(B) can be alike or different and is a unit of the formula

—[CO—NH—Z—NH—CO—NR$^4$-G-NR$^4$]— (III)

and (C) can be alike or different and is a unit of the formula

—[CO—NH—Z—NH—CO-E-X-E]- (IV)

where

X can be alike or different and is an alkylene radical which has 1 to 700 carbon atoms, which is unsubstituted or substituted by fluorine, chlorine, $C_1$-$C_6$ alkyl or $C_1$-$C_6$ alkyl ester and in which methylene units not adjacent to one another can be replaced by groups —O—, —COO—, —OCO— or —OCOO—, or is unsubstituted or substituted arylene radical having 6 to 22 carbon atoms, Y can be alike or different and is a divalent hydrocarbon radical which has 1 to 30 carbon atoms and in which methylene units not adjacent to one another can be replaced by groups —O—, or is the radical —(CH$_2$)$_3$—NH—SiR$_2$—(CH$_2$)$_3$—NH—, Z can be alike or different and is a divalent hydrocarbon radical which has 1 to 30 carbon atoms and is unsubstituted or substituted by fluorine or chlorine, D can be alike or different and is hydrogen atom or a monovalent, unsubstituted or substituted hydrocarbon radical, E can be alike or different and is an oxygen atom or an amino group —ND-, R can be alike or different and is a monovalent hydrocarbon radical which has 1 to 20 carbon atoms and is unsubstituted or substituted by fluorine or chlorine, R$^1$ can be alike or different and is hydrogen atom or a monovalent hydrocarbon radical which has 1 to 20 carbon atoms and is unsubstituted or substituted by fluorine, chlorine or organyloxy groups, or is —(C═O)—R or —N═CR$_2$, R$^4$ can be alike or different and is a radical of the formula —Z'—SiR$_p$(OR$^1$)$_{3-p}$ with Z' equal to a definition specified above for Z, and p being 0, 1 or 2, or is hydrogen atom or a monovalent, unsubstituted or substituted hydrocarbon radical, R$^5$ can be alike or different and is a monovalent, unsubstituted or substituted hydrocarbon radical which is uninterrupted or interrupted by oxygen atoms and contains an aliphatic carbon-carbon multiple bond, G can be alike or different and has a definition specified for Z, R'' is hydrogen atom or a radical —CO—NH—Z—NCO, preferably hydrogen atom, R' if R'' is hydrogen atom is a radical HND-Y—Si(OR$^1$)$_o$R$_{2-o}$—(O—SiR$_q$R$^5$$_{2-q}$)$_n$—O—Si(OR$^1$)$_n$R$_{2-o}$—Y—ND-, HNR$^4$-G-NR$^4$— or HE-X-E-, preferably HND-Y—Si(OR$^1$)$_o$R$_{2-o}$—(O—SiR$_q$R$^5$$_{2-q}$)$_n$—O—Si(OR$^1$)$_o$R$_{2-o}$—Y—ND- or HNR$^4$-G-NR$^4$—, and if R'' is radical —CO—NH—Z—NCO has the definition of radical OCN—Z—NH—CO—ND-Y—Si(OR$^1$)$_o$R$_{2-o}$—(O—SiR$_q$$^5$$_{2-q}$)$_n$—Si(OR$^1$)$_o$R$_{2-o}$—Y—ND-, OCN—Z—NH—CO—NR$^4$-G-NR$^4$— or OCN—Z—NH—CO-E-X-E-, preferably OCN—Z—NH—CO—ND-Y—Si (OR$^1$)$_o$R$_{2-o}$—(O—SiR$_q$R$^5$$_{2-q}$)$_n$—O—Si(OR$^1$)$_o$R$_{2-o}$—Y—ND- or OCN—Z—NH—CO—NR$^4$-G-NR$^4$—, n can be alike or different and is an integer from 1 to 4000, o can be alike or different and is 0, 1 or 2, preferably 0, q is 0 or 1, a is an integer of at least 1, b is 0 or an integer of at least 1, c is 0 or an integer of at least 1, with the proviso that in the molecule there is at least one radical R$^5$ and also the individual blocks (A), (B) and (C) can be distributed randomly in the polymer.

For the purposes of the present invention the term "organopolysiloxanes" is intended to encompass polymeric, oligomeric, and dimeric siloxanes.

Examples of divalent radicals Z are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene and the allylene radical; cycloalkylene radicals such as cyclopentylene, cyclohexylene, cycloheptylene and methylcyclohexylene radicals; arylene radicals such as the phenylene and the naphthylene radicals; alkarylene radicals such as o-, —, p-tolylene radicals, xylylene radicals and ethylphenylene radicals; aralkylene radicals such as the benzylene radical, the α- and the β-phenylethylene radicals, and the 4,4'-methylenediphenylene radical.

Radical Z preferably comprises alkylene groups having 1 to 24 carbon atoms, more preferably the hexylene, 4,4'-methylenebiscyclohexylene and 3-methylene-3,5,5-trimethylcyclohexylene radicals.

Examples of the divalent radicals G are the examples listed for Z. Radical G preferably comprises alkylene radicals having 1 to 6 carbon atoms, arylene radicals such as the o-, —, or p-phenylene radicals, and aralkylene radicals such as the phenylethylene radical, with the radical —CH$_2$CH$_2$— being particularly preferred.

Examples of Z' are all examples stated for Z. Radical Z' preferably comprises alkylene groups having 1 to 24 carbon atoms, more preferably alkylene groups having 1 or 3 carbon atoms.

Examples of Y are all examples specified for Z. Radical Y preferably comprises alkylene radicals having 1 to 30 carbon atoms, in which methylene units not adjacent to one another can be replaced by groups —O—, or comprises arylene radicals having 6 to 22 carbon atoms. With particular preference radical Y comprises alkylene groups having 1 to 3 carbon atoms, especially alkylene groups having 1 or 3 carbon atoms.

Examples of radical X are the butylene radical, ethylene radical, hexylene radical, —(CH$_2$)$_3$—(O—CH(CH$_3$)—CH$_2$)$_{2-3000}$—O—(CH$_2$)$_3$—, —CH(CH$_3$)—CH$_2$—(O—CH(CH$_3$)—CH$_2$)$_{2-3000}$—, —(CH$_2$)$_3$—(O—CH$_2$—CH$_2$)$_{2-300}$—O—(CH$_2$)$_3$—, and —CH$_2$—CH$_2$—(OCH$_2$CH$_2$)$_{2-300}$—.

Radical X preferably comprises polyether radicals, more preferably polypropylene glycol radicals, especially those having 2 to 600 carbon atoms.

Examples of radical R are alkyl radicals such as the methyl, ethyl, n-propyl, isopropyl, n-butyl, isobutyl, tert-butyl, n-pentyl, isopentyl, neopentyl, and tert-pentyl radicals, hexyl radical such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as cyclopentyl, cyclohexyl, cycloheptyl and methylcyclohexyl radicals; aryl radicals such as the phenyl and the naphthyl radicals; alkaryl radicals such as the o, m-, p-tolyl radicals, xylyl radicals and ethylphenyl radicals; aralkyl radicals such as the benzyl radical, and the α- and the β-phenylethyl radicals.

With preference, radical R is a hydrocarbon radical having 1 to 6 carbon atoms, more preferably an alkyl radical having 1 to 4 carbon atoms, especially the methyl radical.

Examples of radical $R^5$ are the vinyl, allyl, 5-hexenyl, cyclohexenyl, 1-propenyl, 3-butenyl and 4-pentenyl radicals, and the 1,3-butadienyl, 4-styryl, acryloyloxymethyl, acryloyloxypropyl, methacryloyloxymethyl and methacryloyloxypropyl radicals.

Preferably radical $R^5$ comprises hydrocarbon radicals which have 2 to 20 carbon atoms, are unsubstituted or substituted by fluorine, chlorine or oxygen groups (e.g., =C=O) and are uninterrupted or interrupted by oxygen atoms. More preferably $R^5$ is a vinyl or allyl radical, especially the vinyl radical.

Examples of radical $R^1$ are the examples specified for radical R, and also alkoxyalkyl radicals.

With preference radical $R^1$ comprises linear or branched alkyl radicals having 1 to 12 carbon atoms and alkoxyalkyl radicals such as the 2-methoxyethyl, 2-ethoxyethyl, and 2-(2'-methoxyethyl) ethyl radicals, more preferably alkyl radicals having 1 to 12 carbon atoms, especially the methyl and ethyl radicals.

Examples of radical $R^4$ are the radicals specified for R, hydrogen atom, and also the radicals —(CH$_2$)$_4$Si(OCH$_3$)$_3$, —(CH$_2$CH(CH$_3$)CH$_2$)Si(OCH$_3$)$_3$, —(CH$_2$CH(CH$_3$)CH$_2$)Si(OCH$_2$CH$_3$)$_3$, —(CH$_2$CH(CH$_3$)CH$_2$)SiCH$_3$(OCH$_3$)$_2$, —(CH$_2$CH(CH$_3$)CH$_2$)SiCH$_3$(OCH$_2$CH$_3$)$_3$, —(CH$_2$)$_3$Si(OCH$_3$)$_3$, —(CH$_2$)$_3$Si(OCH$_2$CH$_3$)$_3$, —(CH$_2$)$_3$SiCH$_3$(OCH$_3$)$_2$, —(CH$_2$)$_3$SiCH$_3$(OCH$_2$CH$_3$)$_2$, —CH$_2$Si(OCH$_3$)$_3$, —CH$_2$Si(OCH$_2$CH$_3$)$_3$, —CH$_2$SiCH$_3$(OCH$_3$)$_2$, —CH$_2$SiCH$_3$(OCH$_3$)$_2$, —(CH$_2$)$_3$SiCH$_3$(OCH$_2$CH$_2$OCH$_3$)$_2$, and —C$_6$H$_4$—(CH$_2$)$_2$SiCH$_3$(OCH$_2$CH$_3$)$_2$.

Preferably radical $R^4$ comprises a hydrogen atom or the above-indicated silyl-substituted alkyl radicals, more preferably a hydrogen atom or the radicals —(CH$_2$)$_3$Si(OCH$_3$)$_3$, —(CH$_2$)$_3$Si(OCH$_2$CH$_3$)$_3$, —(CH$_2$)$_3$SiCH$_3$(OCH$_3$)$_2$, —(CH$_2$)$_3$SiCH$_3$(OCH$_2$CH$_3$)$_2$, —CH$_2$Si(OCH$_3$)$_3$, —CH$_2$Si(OCH$_2$CH$_3$)$_3$, —CH$_2$SiCH$_3$ (OCH$_3$)$_2$, and —CH$_2$SiCH$_3$ (OCH$_3$)$_2$.

Examples of hydrocarbon radicals D are the radicals specified above for R.

Radical D is preferably an alkyl radical or hydrogen atom, more preferably an alkyl radical having 1 to 12 carbon atoms or a hydrogen atom, in particular, a hydrogen atom.

Radical E is preferably an oxygen atom.

Preferably, a is an integer from 1 to 1000, more preferably from 5 to 1000, especially 5 to 100; b preferably is 0 or an integer from 1 to 1000, more preferably 0 or an integer from 5 to 1000, especially 0; and c preferably is 0 or an integer from 1 to 100, more preferably 0 or an integer from 1 to 10, especially 0.

Examples of radicals R' are, if R" is hydrogen atom, radicals which result from the unreacted end groups of the reactants employed, such as

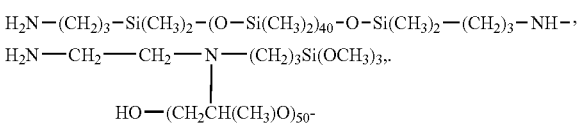

Examples of radicals R' are, if R" is —CO—NH—Z—NCO, radicals which result from the unreacted end groups of the reactants employed, such as

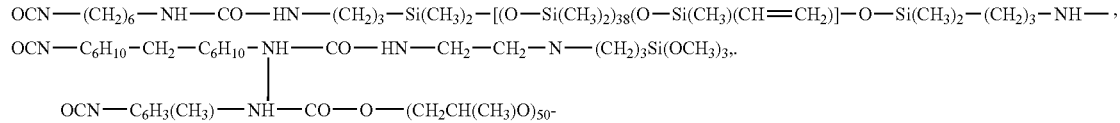

Examples of radicals R" are the hydrogen atom, —CO—NH—(CH$_2$)$_6$—NCO, —CO—NH—C$_6$H$_{10}$—CH$_2$—C$_6$H$_{10}$—NCO and —CO—NH—C$_6$H$_3$(CH$_3$)—NCO.

Preferably n is an integer from 10 to 4000, more preferably from 30 to 1000.

Index p is preferably 0.

Copolymers of the invention comprising units (C) may give rise to a harder material in comparison to copolymers of the invention that comprise no unit (C), since there are more hydrogen bonds in them. If the proportion of component (C) becomes too high, separation phenomena occur between the organic and polysiloxane constituents, so that the transparency of the copolymers of the invention is reduced and the copolymers become turbid. Preference is given to polymers of the formula (I) with c as zero, since consequently there are exclusively siloxane chains present and the polymers as a result have advantages, such as high transparency in conjunction with low surface energies, for example. Preferably b is 0 as well.

Examples of copolymers of the formula (I) are

H[NH(CH$_2$)$_3$SiMe$_2$O(SiMe$_2$O)$_{33}$(SiMeViO)$_2$SiMe$_2$(CH$_2$)$_3$—NH—CO—NH—(CH$_2$)$_6$—NH—CO—NH—CH$_2$CH$_2$—NH—CO—NH—(CH$_2$)$_6$—NH—CO]$_{10}$—NH(CH$_2$)$_3$SiMe$_2$O(SiMe$_2$O)$_{33}$—(SiMeViO)$_2$SiMe$_2$(CH$_2$)$_3$—NH$_2$,

H[NH(CH$_2$)$_3$Si(OMe)$_2$O(SiMe$_2$O)$_{33}$(SiMeViO)$_2$Si(OMe)$_2$(CH$_2$)$_3$—NH—CO—NH—(CH$_2$)$_6$—NH—CO—NH—CH$_2$CH$_2$—NH—CO—NH—(CH$_2$)$_6$—NH—CO]$_{10}$—NH(CH$_2$)$_3$SiMe$_2$O(SiMe$_2$O)$_{33}$(SiMeViO)$_2$SiMe$_2$(CH$_2$)$_3$—NH$_2$,

H[[NH(CH$_2$)$_3$SiMe$_2$O(SiMe$_2$O)$_{33}$(SiMeViO)$_2$SiMe$_2$(CH$_2$)$_3$—NH—CO—NH—(CH$_2$)$_6$—NH—CO—]$_5$—[NH—CH$_2$CH$_2$—NH—CO—NH—(CH$_2$)$_6$—NH—CO]$_5$]$_{10}$—NH—CH$_2$CH$_2$—NH$_2$,

H[NH(CH$_2$)$_3$SiMe$_2$O(SiMe$_2$O)$_{33}$(SiMeViO)$_2$SiMe$_2$(CH$_2$)$_3$—NH—CO—NH—(CH$_2$)$_6$—NH—CO—NH—CH$_2$CH$_2$—NH—CO—NH—(CH$_2$)$_6$—NH—CO—O—(CH$_2$CH$_2$O)$_5$—CO—NH—(CH$_2$)$_6$—NH—CO]$_{10}$—NH(CH$_2$)$_3$SiMe$_2$O(SiMe$_2$O)$_{33}$(SiMeViO)$_2$SiMe$_2$(CH$_2$)$_3$—NH$_2$,

H[NH—CH$_2$—SiMe$_2$O(SiMe$_2$O)$_{33}$(SiMeViO)$_2$SiMe$_2$—CH$_2$—NH—CO—NH—(CH$_2$)$_6$—NH—CO—NH—CH$_2$CH$_2$—NH—CO—NH—(CH$_2$)$_6$—NH—CO—NH—(CH$_2$CH$_2$O)$_5$—CH$_2$CH$_2$—NH—CO—NH—(CH$_2$)$_6$—NH—CO]$_{10}$—CH$_2$—SiMe$_2$O(SiMe$_2$O)$_{33}$(SiMeViO)$_2$SiMe$_2$-CH$_2$—NH$_2$,

H[NH(CH$_2$)$_3$SiMe$_2$O(SiMe$_2$O)$_{33}$(SiMeViO)$_2$SiMe$_2$(CH$_2$)$_3$—NH—CO—NH—C$_{10}$H$_{20}$—NH—CO—NH—CH$_2$CH$_2$—NH—CO—NH—C$_{10}$H$_{20}$—NH—CO]$_{10}$—NH(CH$_2$)$_3$SiMe$_2$O(SiMe$_2$O)$_{33}$(SiMeViO)$_2$SiMe$_2$(CH$_2$)$_3$—NH$_2$,

OCN—C$_7$H$_6$—NH—CO—[NH(CH$_2$)$_3$SiMe$_2$O(SiMe$_2$O)$_{33}$(SiMeViO)$_2$SiMe$_2$(CH$_2$)$_3$—NH—CO—NH—C$_7$H$_6$—NH—CO—NH—CH$_2$CH$_2$—NH—CO—NH—C$_7$H$_6$—NH—CO]$_{10}$—NH(CH$_2$)$_3$SiMe$_2$O(SiMe$_2$O)$_{33}$(SiMeViO)$_2$SiMe$_2$(CH$_2$)$_3$—NH—CO—NH—C$_7$H$_6$—NCO, and OCN—C$_7$H$_6$—NH—CO—[NH(CH$_2$)$_3$SiMe$_2$O(SiMe$_2$O)$_{33}$(SiMeViO)$_2$SiMe$_2$(CH$_2$)$_3$—NH—CO—NH—C$_7$H$_6$—NH—CO—NH—CH$_2$CH$_2$—NH—CO—NH—C$_7$H$_6$—NH—CO]$_{10}$—NH—CH$_2$CH$_2$—NH—CO—NH—C$_7$H$_6$—NCO.

H[NH(CH$_2$)$_3$SiMe$_2$O(SiMe$_2$O)$_{33}$(SiMeAll-O)$_2$SiMe$_2$(CH$_2$)$_3$—NH—CO—NH—(CH$_2$)$_6$—NH—CO—NH—CH$_2$CH$_2$—NH—CO—NH—(CH$_2$)$_6$—NH—CO]$_{10}$—NH(CH$_2$)$_3$SiMe$_2$O(SiMe$_2$O)$_{33}$(SiMeAll-O)$_2$SiMe$_2$(CH$_2$)$_3$—NH$_2$,

H[NH(CH$_2$)$_3$Si(OMe)$_2$O(SiMe$_2$O)$_{33}$(SiMeAll-O)$_2$Si(OMe)$_2$(CH$_2$)$_3$—NH—CO—NH—(CH$_2$)$_6$—NH—CO—NH—CH$_2$CH$_2$—NH—CO—NH—(CH$_2$)$_6$—NH—CO]$_{10}$—NH(CH$_2$)$_3$SiMe$_2$O(SiMe$_2$O)$_{33}$(SiMeAll-O)$_2$SiMe$_2$(CH$_2$)$_3$—NH$_2$,

H[[NH(CH$_2$)$_3$SiMe$_2$O(SiMe$_2$O)$_{33}$(SiMeAll-O)$_2$SiMe$_2$(CH$_2$)$_3$—NH—CO—NH—(CH$_2$)$_6$—NH—CO—]$_5$—[NH—CH$_2$CH$_2$—NH—CO—NH—(CH$_2$)$_6$—NH—CO]$_5$]$_{10}$—NH—CH$_2$CH$_2$—NH$_2$,

H[NH(CH$_2$)$_3$SiMe$_2$O(SiMe$_2$O)$_{33}$(SiMeAll-O)$_2$SiMe$_2$(CH$_2$)$_3$—NH—CO—NH—(CH$_2$)$_6$—NH—CO—NH—CH$_2$CH$_2$—NH—CO—NH—(CH$_2$)$_6$—NH—CO—O—(CH$_2$CH$_2$O)$_5$—CO—NH—(CH$_2$)$_6$—NH—CO]$_{10}$—NH(CH$_2$)$_3$SiMe$_2$O(SiMe$_2$O)$_{33}$(SiMeAll-O)$_2$SiMe$_2$(CH$_2$)$_3$—NH$_2$,

H[NH—CH$_2$—SiMe$_2$O(SiMe$_2$O)$_{33}$(SiMeAll-O)$_2$SiMe$_2$—CH$_2$—NH—CO—NH—(CH$_2$)$_6$—NH—CO—NH—CH$_2$CH$_2$—NH—CO—NH—(CH$_2$)$_6$—NH—CO—NH—(CH$_2$CH$_2$O)$_5$—CH$_2$CH$_2$—NH—CO—NH—(CH$_2$)$_6$—NH—CO]$_{10}$—CH$_2$—SiMe$_2$O(SiMe$_2$O)$_{33}$(SiMeAll-O)$_2$SiMe$_2$-CH$_2$—NH$_2$,

H[NH(CH$_2$)$_3$SiMe$_2$O(SiMe$_2$O)$_{33}$(SiMeAll-O)$_2$SiMe$_2$(CH$_2$)$_3$—NH—CO—NH—C$_{10}$H$_{20}$—NH—CO—NH—CH$_2$CH$_2$—NH—CO—NH—C$_{10}$H$_{20}$—NH—CO]$_{10}$—NH(CH$_2$)$_3$SiMe$_2$O(SiMe$_2$O)$_{33}$(SiMeAll-O)$_2$SiMe$_2$(CH$_2$)$_3$—NH$_2$, OCN—C$_7$H$_6$—NH—CO—[NH(CH$_2$)$_3$SiMe$_2$O(SiMe$_2$O)$_{33}$(SiMeAll-O)$_2$SiMe$_2$(CH$_2$)$_3$—NH—CO—NH—C$_7$H$_6$—NH—CO—NH—CH$_2$CH$_2$—NH—CO—NH—C$_7$H$_6$—NH—CO]$_{10}$—NH(CH$_2$)$_3$SiMe$_2$O(SiMe$_2$O)$_{33}$(SiMeAll-O)$_2$SiMe$_2$(CH$_2$)$_3$—NH—CO—NH—C$_7$H$_6$—NCO, and OCN—C$_7$H$_6$—NH—CO—[NH(CH$_2$)$_3$SiMe$_2$O(SiMe$_2$O)$_{33}$(SiMeAll-O)$_2$SiMe$_2$(CH$_2$)$_3$—NH—CO—NH—C$_7$H$_6$—NH—CO—NH—CH$_2$CH$_2$—NH—CO—NH—C$_7$H$_6$—NH—CO]$_{10}$—NH—CH$_2$CH$_2$—NH—CO—NH—C$_7$H$_6$—NCO, where Me is methyl radical, Vi is vinyl radical, and All is allyl radical —CH$_2$—CH=CH$_2$.

Preferably 1% to 20%, more preferably 2% to 10%, of all the SiC-bonded radicals in the inventive polymer of the formula (I) are radicals R$^5$.

The inventive copolymers of the formula (I) contain preferably greater than 70% by weight, more preferably greater than 80% by weight, of units A of the formula (II), based in each case on the total weight of the copolymer.

At room temperature and under the pressure of the surrounding atmosphere, in other words approximately 900 to 1100 hPa, the inventive copolymers of the formula (I) are preferably rubber-elastic solids having tensile strengths of between preferably about 0.5 and 20 MPa and also breaking extensions between preferably about 50% to 1000%. They soften under a pressure of 900 to 1100 hPa at temperatures between preferably 60 and 200° C., and in so doing they gradually lose their rubber-elastic properties.

By exposure to radiation it is possible, then, for the crosslinkable radicals $R^5$ to polymerize with one another or with any further crosslinkable aliphatically unsaturated groups. In addition, if radicals $OR^1$ are present, they can condense to form siloxane bonds, and if $R^1$ is other than hydrogen atom there may be a hydrolysis reaction to form OH groups as a result, for example, of exposure to moisture.

As against the starting polymer prior to crosslinking, these inventive polymers of the formula (I) crosslinked in this way preferably have a softening point which is shifted markedly in the direction of higher temperatures. This opens up the possibility of preparing polymers which can be processed at relatively low temperatures but then in use can be exposed to higher temperatures.

The copolymers of the invention have the advantage, moreover, that they have very good mechanical properties without any need to add fillers.

Furthermore, the copolymers of the invention are distinguished by outstanding physical properties of the kind known for polyorganosiloxanes, such as low glass transition temperatures, transparency, low surface energies, low hydrophobicity, good dielectric properties, and high gas permeability, for example.

Further advantages of the copolymers of the invention are the high thermal and oxidative stability, good stabilities toward swelling and decomposition by solvents, especially polar organic solvents.

In accordance with the number of the units (C) in the copolymers of the invention it is possible to tailor the properties, such as peel strength and detachment resistance, printability, tensile strength and tear strength, or water-vapor permeability, for example.

The copolymers of the invention can be prepared by analogy with any desired processes which are already known to the skilled worker and which are used, for example, for the synthesis of (pre)polymers for polyurethanes.

The present invention further provides a process for preparing the inventive copolymers of the formula (I) by reacting
a) at least one polymer of the formula

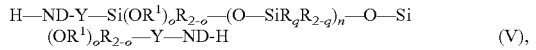

b) at least one diisocyanate of the formula

or blocked diisocyanates (thermally unstable reaction products of isocyanates with, for example, phenols, ketoximes, malonic esters, nitrogen-containing heterocycles),
c) if desired a compound of the formula

d) if desired compounds of the formula

e) if desired a catalyst, and
f) if desired at least one solvent,

X, Y, Z, D, E, G, R, $R^1$, $R^4$, $R^5$, and o and q being as defined above.

Examples of the inventively used compounds of the formula (V) are α,ω-aminopropyldimethylsilyl-terminated poly (dimethyl-co-methylvinyl)siloxanes, α,ω-amino-propyldimethoxysilyl-terminated poly(dimethyl-co-methylvinyl) siloxanes, α,ω-aminomethyldimethylsilyl-terminated poly (dimethyl-co-methylvinyl)siloxanes, and α,ω-aminomethyldimethoxysilyl-terminated poly(dimethyl-co-methylvinyl)siloxanes.

Preferred compounds of the formula (VI) which can be used if desired in the process of the invention are 3-(2-aminoethyl)aminopropyltrimethoxysilane, 3-(2-aminoethyl) aminopropyltriethoxysilane, 3-(2-amino-ethyl)aminopropylmethyldimethoxysilane, 3-(2-aminoethyl) aminopropyldimethylmethoxysilane, 3-(2-aminoethyl) aminopropylmethyldiethoxysilane, N,N'-bis(3-trimethoxysilylpropyl)ethylenediamine, N,N'-bis(3-triethoxysilylpropyl)ethylenediamine, N,N'-bis(3-dimethoxymethylsilylpropyl)ethylenediamine, and N,N'-bis (3-diethoxymethylsilylpropyl)ethylenediamine, N-trimethoxysilylmethylethylenediamine, N-triethoxysilylmethylethylenediamine, N-dimethoxymethylsilylmethylethylenediamine, N-diethoxymethylsilylmethylethylenediamine, and N-methoxydimethylsilylmethylethylenediamine.

Examples of the inventively used isocyanates of the formula (VII) are hexylene diisocyanate, 4,4'-methylenedicyclohexylene diisocyanate, 4,4'-methylenediphenylene diisocyanate, 1,3-diazetidine-2,4-dione bis(4,4'-methylenedicyclohexyl)diisocyanate, 1,3-diazetidine-2,4-dione bis(4,4'-methylenediphenyl)-diisocyanate, tetramethylenexylylene diisocyanate, and isophorone diisocyanate, preference being given to hexylene diisocyanate, 4,4'-methylenedicyclohexylene diisocyanate, 4,4'-methylenediphenylene diisocyanate, tetramethylenexylylene diisocyanate, and isophorone diisocyanate, and particular preference to hexylene diisocyanate, 4,4'-methylenedicyclohexylene diisocyanate, and isophorone diisocyanate.

Examples of the compounds of the formula (VIII) inventively used if desired are compounds known from polyurethane chemistry, such as diols, such as ethylene glycol, polyethylene glycols, polypropylene glycols, polyester polyols, diamines such as, for example, ethylenediamine, 5-amino-3-(aminomethyl)-1,3,3-trimethylcyclohexane), bis(4-amino-3-methylphenyl)methane, isomer mixture of diaminodiethylmethylbenzene, bis(4-amino-3-chlorophenyl)methane, 2-methylpropyl4-chloro-3,5-diaminobenzoate, and aminoterminated polyethers (ATPE), for example.

The stoichiometry of the reactants for preparing the copolymers of the invention is preferably selected such that the molar ratio of the isocyanate groups from the compounds of the formula (VII) to the sum of the EH and NH groups, reactive with the isocyanate groups, from the compounds of the formulae (V), (VI), and (VIII) is in the range from preferably 0.7 to 1.3, more preferably 0.95 to 1.05, in particular 1. With a ratio of the isocyanate groups to the reactive groups of greater than 1, i.e., an excess of isocyanate groups, inventive polymers of the formula (I) are produced with R"=NH—CO—Z—NCO and the resultant radicals R' as defined above at the other end of the polymer chains. With a ratio less than 1, i.e., a deficit amount of isocyanate groups, inventive polymers of the formula (I) are produced with R"=H and the resultant radicals R' as defined above at the other end of the polymer chains.

Examples of the catalysts used if desired are all catalysts known to date which promote the addition of the isocyanate groups of the compounds of the general formulae (VII) onto the active groups of the polymers in accordance with the formulae (V), (VI) and (VIII), such as, for instance, diorganotin compounds and bismuth compounds.

With particular preference no catalysts are used in the process of the invention.

If catalysts are used in the process of the invention, the amounts involved are from preferably 0.0001 to 1 part by weight, more preferably 0.001 to 0.1 part by weight, based in each case on 100 parts by weight of the total mixture.

Examples of the solvents used if desired in the process of the invention are tetrahydrofuran, dimethyl-formamide, isopropanol, and methyl ethyl ketone.

With particular preference no solvents are used in the process of the invention.

If solvents are used in the process of the invention, the amounts involved are from preferably 10 to 200 parts by weight, more preferably 10 to 100 parts by weight, based in each case on 100 parts by weight of total mixture.

The reaction of the invention may take place in solution or in bulk (without solvent), preference being given to a reaction in bulk.

If the reaction of the invention takes place in solution, temperatures are preferably from 0 to 100° C. and with particular preference from 20 to 80° C.

If the reaction of the invention takes place in bulk, temperatures above the softening point of the copolymer of the formula (I) prepared are preferred.

In the case of a discontinuous operation, the process of the invention is carried out preferably under the pressure of the surrounding atmosphere, i.e., at between 900 and 1100 hPa. In the case of continuous preparation, in a twin-screw extruder, for example, the process is operated at a pressure of preferably up to 15 MPa in some sections of the extruder and, for devolatilization, at pressures of preferably 0.1 to 1100 hPa.

The process of the invention is carried out preferably in the absence of moisture and radiation, although it is also possible to operate in the presence of water and radiation.

The preparation of the inventive copolymers in accordance with the general formula (I) can take place with methods which are known to the skilled worker, such as by means of extruders, compounders, roll mills, dynamic mixers or static mixers, for example. The copolymers of the invention can be prepared continuously or batchwise. Preferably the preparation is carried out continuously.

The siloxane copolymers prepared in accordance with the invention can then be freed by any desired processes known to date from any reactants that may still be present and/or from any solvents and/or catalysts that may have been used, by means of distillation or extraction, for example.

The components used in the process of the invention are commercially customary products and/or can be prepared by methods which are commonplace in chemistry.

The components used in the process of the invention may in each case be one kind of such a component or else a mixture of at least two kinds of a respective component.

The process of the invention has the advantage that it is simple to implement and that a large number of possible copolymers can be prepared with great variability.

The process of the invention has the advantage, moreover, that copolymers can be prepared in a well-defined way.

The copolymers of the formula (I), invention and copolymers prepared in accordance with the invention, can be prepared and processed using the typical processing methods for radiation-crosslinkable and, where appropriate, moisture-crosslinkable polymers and/or thermoplastic elastomers—for example, by means of extrusion, injection molding, blow molding, vacuum thermoforming. Processing in the form of a solution or emulsion or suspension is a further possibility.

Preferred applications of the inventive or inventively prepared copolymers of the formula (I) are uses as a constituent in adhesives and sealants, as a base material for thermoplastic elastomers such as cable sheathing, hoses, seals, and keyboard mats, for example, for membranes, such as selectively gas-permeable membranes, as additives in polymer blends, or for coating applications, for example, in antistick coatings, tissue-compatible coatings, flame-retardant coatings and as biocompatible materials. Further application possibilities are as sealants and adhesives, such as hotmelt adhesives, for example, adhesives for application as a solution, primers for improving the adhesion of sealants and adhesives to different substrates, additives for polymer processing, antifouling coatings, cosmetics, bodycare products, paint additives, an auxiliary in laundry detergents and in the treatment of textiles, for the modification of resins, or for bitumen modification.

The use of the inventive or inventively prepared copolymers is possible in numerous applications, such as, for example, in sealants, adhesives, as material for modifying fibers, as plastics additive, for example, as impact modifiers or flame retardants, as material for defoamer formulations, as a high-performance polymer (thermoplastic, thermoplastic elastomer, elastomer), as packaging material for electronic components, in insulation materials or shielding materials, in cable sheathing, in antifouling materials, as an additive for scouring, cleaning or polishing products, as an additive for bodycare compositions, as a coating material for wood, paper, and paperboard, as a mold release agent, as a biocompatible material in medical applications such as contact lenses, as a coating material for textile fibers or textile fabric, as a coating material for natural substances such as leather and furs, for example, as material for membranes, and as material for photoactive systems—for lithographic techniques, flexographic printing plates, optical data securement or optical data transmission, for example.

Preference extends to the use of the copolymers of the invention as a release coating for adhesive tapes and labels, fiber coating for textiles, for example, extrusion aids for thermoplastics processing, medical devices such as catheters, infusion bags or infusion tubes, hotmelt adhesives, PSA coatings, components for the automobile industry that can be overpainted and oversprayed, as an additive for polymer modification such as a plasticizer or impact modifier, film for laminated safety glass, or as a joint sealant for the construction industry.

The copolymers of the invention can be employed wherever organopolysiloxane-polyurea copolymers have been employed to date.

The copolymers of the formula (I) prepared in accordance with the invention are especially suitable for use in crosslinkable compositions, such as radiation-crosslinkable compositions, for instance.

The present invention further provides crosslinkable compositions comprising inventive or inventively prepared copolymers of the formula (I).

The crosslinkable compositions of the invention are preferably radiation-crosslinkable compositions.

Particular preference is given to crosslinkable compositions comprising (i) copolymer of the formula (I), if desired (ii) at least one crosslinker, if desired (iii) a photopolymerization initiator, if desired
(iv) filler, if desired
(v) adhesion promoter, if desired
(vi) further substances selected from the group containing plasticizers, stabilizers, antioxidants, flame retardants, light stabilizers, and pigments, if desired
(vii) crosslinkable polymers different to (i), and if desired
(viii) polymerization inhibitors.

These crosslinkable compositions of the invention are preferably one-component compositions. To prepare these one-component compositions it is possible for the constituents respectively used to be mixed with one another in any desired manner known to date. This mixing takes place preferably at room temperature or at a temperature which comes about when the constituents are combined at room temperature, without additional heating or cooling, and at the pressure of the surrounding atmosphere, in other words about 900 to 1100 hPa. Alternatively, if desired, this mixing can take place at higher or lower pressures—at lower pressures, for example, in order to avoid gas inclusions.

The preparation of the compositions of the invention and their storage take place preferably under substantially radiation-free and, if desired, anhydrous conditions, in order to prevent premature reaction of the compositions.

Crosslinkers (ii) employed if desired can be any crosslinkers which have also been employed to date in radiation-crosslinkable compositions; they preferably contain a radiation-curable, aliphatic carbon-carbon multiple bond.

Crosslinkers (ii) are preferably vinyl silanes and allyl silanes, olefins, acrylates and methacrylates, more preferably acrylates and methacrylates, and, in particular, monofunctional and difunctional acrylates and methacrylates.

Examples of crosslinkers (ii), which are employed if desired, are monofunctional oligo(ethers) and monomeric acrylates and methacrylates, such as 2-(2-ethoxy-ethoxy) ethyl acrylate, 2-phenoxyethyl acrylate, caprolactone acrylate, cyclic trimethylolpropane formal acrylate, ethoxylated nonylphenol acrylate, isobornyl acrylate, isodecyl acrylate, lauryl acrylate, octyldecyl acrylate, stearyl acrylate, tetrahydro-furfuryl acrylate, tridecyl acrylate, 2-phenoxyethyl methacrylate, ethoxylated hydroxyethyl methacrylate, isobornyl methacrylate, lauryl methacrylate, methoxypolyethylene glycol(350) monomethacrylate, methoxypolyethylene glycol (550)monomethacrylate, polypropylene glycol monomethacrylate, stearyl methacrylate, tetrahydrofurfuryl methacrylate;

difunctional oligo(ethers) and monomeric acrylates and methacrylates, such as 1,6-hexanediol diacrylate, alkoxylated diacrylates, alkoxylated hexanediol diacrylates, diethylene glycol diacrylate, dipropylene glycol diacrylate, ester diol diacrylate, ethoxylated bisphenol A diacrylates, polyethylene glycol(200) diacrylate, polyethylene glycol(400) diacrylate, polyethylene glycol(600) diacrylate, propoxylated neopentyl glycol diacrylate, tetraethylene glycol diacrylate, tricyclodecanedimethanol diacrylate, triethylene glycol diacrylate, tripropylene glycol diacrylate, 1,3-butylene glycol dimethacrylate, 1,4-butanediol dimethacrylate, 1,6-hexanediol dimethacrylate, diethylene glycol dimethacrylate, ethoxylated bisphenol A dimethacrylates, ethylene glycol dimethacrylate, polyethylene glycol(200) dimethacrylate, polyethylene glycol(400) dimethacrylate, polyethylene glycol(600) dimethacrylate, tetraethylene glycol dimethacrylate, triethylene glycol dimethacrylate;

trifunctional and higher polyfunctional oligo(ethers) and monomeric acrylates and methacrylates, such as dipentaerythritol pentaacrylate, ditrimethylolpropane tetraacrylate, ethoxylated trimethylolpropane triacrylates, pentaerythritol tetraacrylate, pentaerythritol triacrylate, propoxylated glycerol triacrylates, propoxylated trimethylolpropane triacrylate, trimethylolpropane triacrylate, tris(2-hydroxyethyl) isocyanurate triacrylate, trimethylol-propane trimethacrylate;

epoxy acrylates, such as bisphenol A epoxyacrylate, epoxidized soybean oil acrylate, epoxy novolac acrylate oligomer, fatty acid-modified bisphenol A epoxy-acrylate;

aliphatic and aromatic urethane acrylates and polyester acrylates;

silanes containing SiC-bonded vinyl, allyl, acryloyloxy, methacryloyloxy groups and also their partial hydrolyzates and cohydrolyzates;

styrene, isoprene, butadiene and vinyl acetate.

If the crosslinkable compositions of the invention comprise crosslinkers (ii), the amounts involved are preferably from 0.05 to 70 parts by weight, more preferably 0.2 to 30 parts by weight, based in each case on 100 parts by weight of crosslinkable composition.

As photopolymerization initiators (iii) employed it is possible to use all of the initiators known to the skilled worker, or mixtures thereof.

Examples of initiators (iii) used if desired are benzyl dimethyl ketal, 2-hydroxy-2-methylphenylpropan-1-one, 1-hydroxycyclohexyl phenyl ketone, isopropylthioxanthone, bisacylphosphine oxide, 1-[4-(2-hydroxyethoxy)phenyl]-2-hydroxy-2-methylpropan-1-one, benzoin n-butyl ether, polymeric hydroxyketones, such as oligo(2-hydroxy-2-methyl-1, 4-(1-methylvinyl)phenylpropanone), acenaphthylquinone, α-aminoacetophenone, benzanthraquinone, benzoin methyl ether, benzoin isopropyl ether, benzoin isobutyl ether, benzophenone, benzyl dimethyl acetal, benzyl 1-methyl-1-ethyl acetal, 2,2-diethoxy-2-phenylacetophenone, 2,2-diethoxyacetophenone, 2-dimethoxybenzoyldiphenylphosphine oxide, 2,2-dimethoxy-2-phenylacetophenone, such as Irgacure® 651 (Ciba-Geigy, Basle, CH), 2-ethylanthraquinone, ethyl 2,4,6-trimethylbenzoylphenylphosphinate, hydroxyacetophenone, 2-hydroxy-2-methylpropiophenone, 2-hydroxy-2-methyl-4'-isopropylisopropiophenone, 1-hydroxycyclohexyl phenyl ketone, 4'-morpholinodeoxybenzoin, 4-morpholinobenzophenone, α-phenylbutyrophenone, 2,4, 6-trimethylbenzoyldiphenylphosphine oxide, and 4,4'-bis (dimethylamino)benzophenone.

A photopolymerization initiator can also be used in combination with coinitiators, such as ethylanthraquinone with 4,4'-bis(dimethylamino)benzophenone, benzoin methyl ether with triphenylphosphine, benzyl dimethyl ketal with benzophenone, diacylphosphine oxides with tertiary amines, or acyldiarylphosphine oxides with benzyl dimethyl acetal.

If the crosslinkable compositions of the invention comprise photopolymerization initiator (iii), the amounts involved are preferably from 0.01 to 5 parts by weight, more preferably 0.05 to 3 parts by weight, based in each case on 100 parts by weight of crosslinkable composition.

Fillers (iv) employed if desired can be any fillers which have also been employed to date in crosslinkable compositions. Examples of fillers are reinforcing fillers, which are fillers having a BET surface area of at least 30 m²/g, such as carbon blacks, fumed silica, precipitated silica, and silicon-aluminum mixed oxides, it being possible for said fillers to have been hydrophobicized, and also nonreinforcing fillers, which are fillers having a BET surface area of less than 30 m²/g, such as powders of quartz, cristobalite, diatomaceous earth, calcium silicate, zirconium silicate, montmorillonites, such as bentonites, zeolites, including the molecular sieves, such as sodium aluminum silicate, metal oxides, such as aluminum oxide or zinc oxide and/or their mixed oxides, metal hydroxides, such as aluminum hydroxide, barium sulfate, calcium carbonate, gypsum, silicon nitride, silicon carbide, boron nitride, glass powder, carbon powder, and polymer powders, and hollow glass and plastic beads.

Filler (iv) preferably comprises fumed silicas, a BET surface area of at least 30 m²/g being particularly preferred.

If the compositions of the invention comprise fillers (iv), the amounts involved are from preferably 1 to 50 parts by weight, preferably 2 to 30 parts by weight, based in each case on 100 parts by weight of crosslinkable composition.

As adhesion promoters (v), which can be employed if desired, it is possible to employ any adhesion promoters which have also been employed to date in radiation-crosslinkable compositions. Examples of adhesion promoters (v) are silanes containing SiC-bonded vinyl, acryloyloxy, methacryloyloxy groups and also their partial hydrolyzates and cohydrolyzates, and acrylates such as 2-(2-ethoxyethoxy)ethyl acrylate, 2-phenoxyethyl acrylate, cyclic trimethylolpropane formal acrylate, 1,6-hexanediol diacrylate, pentaerythritol tetraacrylate, tetrahydrofurfuryl methacrylate, methoxypolyethylene glycol(550) monomethacrylate, and stearyl methacrylate.

If the compositions of the invention comprise adhesion promoters (v), the amounts involved are preferably from 0.01 to 5 parts by weight, more preferably 0.5 to 4 parts by weight, based in each case on 100 parts by weight of crosslinkable composition.

Examples of further substances (vi) are plasticizers, such as trimethylsilyl-terminated polydimethylsiloxanes and hydrocarbons having about 16 to 30 carbon atoms, stabilizers, such as 2-ethylhexyl phosphate, octylphosphonic acid, polyethers, antioxidants, flame retardants, such as phosphoric esters, light stabilizers, and pigments, such as titanium dioxide and iron oxides.

The further substances (vi), employed if desired, are preferably plasticizers such as trimethylsilyl-terminated polydimethylsiloxanes and hydrocarbons having about 16 to 30 carbon atoms, stabilizers such as 2-ethylhexyl phosphate, octylphosphonic acid, polyethers, flame retardants such as phosphoric esters, and pigments such as titanium dioxide and iron oxides, particular preference being given to stabilizers and pigments.

If constituent (vi) is employed, the amounts involved are preferably from 0.01 to 30 parts by weight, more preferably 0.05 to 25 parts by weight, based in each case on 100 parts by weight of crosslinkable composition.

The crosslinkable compositions of the invention may if desired comprise crosslinkable polymers (vii), such as organopolysiloxanes having reactive end groups, and aliphatic and aromatic urethane acrylates and polyester acrylates. Examples of such crosslinkable siloxanes (vii) are α,ω-diacryloyloxymethylpolydimethylsiloxanes, α,ω-divinylpolydimethylsiloxanes, and α,ω-methacryloyl-oxypropyl-terminated polydimethylsiloxanes.

Component (vii) employed if desired in the crosslinkable compositions of the invention preferably comprises polydiorganosiloxanes having at least one radiation-crosslinkable group at the chain ends, more preferably polydimethylsiloxanes having at least one acrylic group at the chain ends, particularly α,ω-diacryloyloxymethylpolydimethylsiloxanes and α,ω-meth-acryloyloxypropyl-terminated polydimethylsiloxanes, having a viscosity of 100 to 500,000 mPas.

The crosslinkable compositions of the invention preferably comprise component (vii). This constituent is used preferably for adjusting processing properties such as viscosity, for example.

If component (vii) is used, the amounts involved are preferably from 1 to 50 parts by weight, more preferably 2 to 25 parts by weight, based in each case on 100 parts by weight of crosslinkable composition.

The compositions of the invention may comprise polymerization inhibitors (viii). For reasons of better handling it is preferred to add small amounts of inhibitors (viii) to the compositions of the invention in order, for example, to prevent premature crosslinking of a usable formulation during its storage. Examples of inhibitors employed if desired are all customary inhibitors which have also been used to date in operations involving free-radical mechanisms, such as hydroquinone, 4-methoxyphenol, 2,6-di-tert-butyl -4-methylphenol or phenothiazine.

If inhibitors (viii) are used, the amounts involved are preferably from 10 to 10,000 ppm, more preferably 50 to 1,000 ppm, based in each case on 100 parts by weight of the crosslinkable composition.

The individual constituents of the crosslinkable compositions of the invention may in each case comprise one kind of such a constituent or else a mixture of at least two different kinds of such constituents.

In particular the compositions of the invention contain no further constituents apart from component (i), if desired (ii), (iii), (iv), (v), (vi), (vii), and (viii).

The preparation of the crosslinkable compositions of the invention takes place with methods which are known to the skilled worker, such as by means of extruders, compounders, roll mills, dynamic mixers or static mixers, for example. The compositions of the invention can be prepared continuously or batchwise. Preferably the preparation takes place continuously.

The compositions of the invention can be crosslinked by irradiation with ultraviolet light (UV light), laser or sunlight. Preferably the compositions of the invention are crosslinked by UV light. UV light is preferably light with wavelengths in the range from 200 to 400 nm. The UV light may be generated in, for example, xenon lamps, low-pressure, medium-pressure or high-pressure mercury lamps or excimer lamps. Light suitable for crosslinking also includes that having a wavelength of 400 to 600 nm, in other words the light known as "halogen light".

The energy sources suitable for crosslinking the compositions of the invention may alternatively be x-rays, gamma rays or electron beams, or simultaneous application of at least two different kinds of such radiation. In addition to the high-energy radiation it is possible to employ heat supply, including heat supply by means of infrared light. A heat supply of this kind, however, is by no means necessary and is preferably omitted, in order to reduce the energy expenditure.

The irradiation wavelengths and irradiation times are tailored to the photopolymerization initiators used and to the compounds to be polymerized.

The compositions of the invention are crosslinked preferably at room temperature. If desired, crosslinking may also take place at temperatures higher or lower than room temperature, such as at −50 to 15° C. or at 30 to 150° C., for example. Preferably the crosslinking is carried out at a pressure of 100 to 1100 hPa, in particular at the pressure of the surrounding atmosphere, in other words about 900 to 1100 hPa.

The present invention further provides moldings produced by crosslinking the compositions of the invention.

In comparison to non-crosslinked thermoplastic siloxane-urea copolymers of the prior art, the vulcanizates of the copolymers of the invention have, after radiation crosslinking, a lower dependence of the mechanical properties with temperature. Through crosslinking, the vulcanizates of the copolymers of the invention lose their plasticity when the temperature is increased, and so are no longer able to flow and are therefore more dimensionally stable. All in all, therefore, the vulcanizates of the invention have better mechanical properties over a wider temperature range, and so can be used in more diverse fields of use.

The crosslinkable compositions of the invention are used preferably as an adhesive, hotmelt adhesive, PSA (pressure-sensitive adhesive), sealant, coating for substrates including paper, textile, fibers or silicatic surfaces, for example, impregnating agent, paint, constituent in composite materials, additive for polymers, molding, and component for medical use, and also for use in automobile construction or laminated glass.

The compositions of the invention have the advantage that they possess all of the abovementioned advantages of the copolymers of the invention that are used.

The compositions of the invention have the advantage that they exhibit very good mechanical properties.

Further advantages of the compositions of the invention are the high thermal and oxidative stability, good stabilities toward swelling and decomposition by polar organic solvents.

The compositions of the invention have the advantage that the properties, such as peel strength and detachment resistance, printability, tensile strength and tear strength, or water-vapor permeability, for example, can be tailored.

The moldings of the invention have the advantage of possessing a relatively low dependence of the mechanical properties with temperature, in particular at relatively high temperatures.

The moldings of the invention have the advantage, moreover, of possessing a very good adhesion to substrates.

In the examples described below, all viscosity data relate to a temperature of 25° C., unless indicated otherwise, are carried out at the pressure of the surrounding atmosphere, about 1000 hPa, and at room temperature, in other words at about 23° C., or at a temperature which comes about when the reactants are combined at room temperature without additional heating or cooling, and at a relative atmospheric humidity of about 50%. Moreover, all parts and percentages data, unless otherwise indicated, are by weight.

The Shore A hardness is determined in accordance with DIN (Deutsche Industrie Norm [German Industry Standard]) 53505 (August 2000 edition).

Tensile strength, breaking elongation and modulus (stress at 100% elongation) were determined in accordance with DIN 53504 (May 1994 edition) on specimens of shape S2.

In the examples below, the irradiation took place using a xenon lamp in an instrument of the type "Heraeus Suntest CPS" (550 W/m$^2$) from Atlas Material Testing Technology GmbH (63589 Linsengericht, Germany) (called "UV lamp" below).

EXAMPLE 1

13 parts by weight of an $\alpha,\omega$-aminopropyl-terminated polydimethylsiloxane with a viscosity of 50 mPas and 6 parts by weight of an $\alpha,\omega$)-aminopropyl-terminated poly(dimethyl-co-methylvinyl)siloxane (vinyl:methyl groups=1:4) with a viscosity of 35 mPas are mixed (aminosiloxane mixture).

10.0 kg/h of this aminosiloxane mixture are metered at 150° C. into the second sector (length L/D=4)of a co-rotating W&P twin-screw extruder (25 mm screw diameter, L/D=40). 0.99 kg/h of isophorone diisocyanate are metered in at 175° C. in the third sector. Sectors 3 to 10 are held at 175° C.; in the penultimate sector evacuation is carried out at 30 mbar. The product is pelletized using an underwater pelletizing unit from Gala GmbH (Xanten-Birten, Germany). Colorless, thermoplastic pellets are obtained which are pressed in a press at 170° C. to give a plate 2 mm thick; mechanical properties are determined from this plate. Hardness: 56 Shore A, tensile strength: 6.05 MPa, elongation at break: 680%, stress at 100% elongation: 1.54 MPa.

EXAMPLE 2

10.0 kg/h of the aminosiloxane mixture described in example 1 are metered at 100° C. into the second sector (length L/D=4) of a co-rotating W&P twin-screw extruder (25 mm screw diameter, L/D=40). 1.09 kg/h of tetramethylxylylene diisocyanate are metered in at 150° C. in the third sector. The remaining sectors (3 to 10) are held at 160° C.; in the penultimate sector evacuation is carried out with 30 mbar. The product is pelletized using an underwater pelletizing unit from Gala GmbH (Xanten-Birten, Germany). Colorless, thermoplastic pellets are obtained which are pressed in a press at 170° C. to give a plate 2 mm thick; mechanical properties are determined from this plate. Hardness: 61 Shore A, tensile strength: 4.14 MPa, elongation at break: 573%, stress at 100% elongation: 2.39 MPa.

EXAMPLE 3

70 g of the pellets produced in example 1 are dissolved in 350 g of tetrahydrofuran (THF). 17.5 g of an $\alpha,\omega$-trimethylsilyl-terminated polydimethylsiloxane having a viscosity of 10 mPas, 11.7 g of tetrahydrofurfuryl acrylate, and 1.4 g of $\alpha,\omega$-dimethoxy-$\omega$-phenylacetophenone (benzyl dimethyl ketal) are mixed in. The solution is poured into a PTFE mold with a depth of approximately 2 mm and the solvent is evaporated in the absence of light. This procedure is repeated until sheets 2 mm thick are obtained, from which test specimens are punched. Mechanical data for S2 rods are given in table 1.

One of the sheets produced is irradiated for 1 minute while a second sheet is irradiated for 5 minutes with the UV lamp described above. Mechanical data for S2 rods are given in table 1.

EXAMPLE 4

70 g of the pellets produced in example 1 are dissolved in 350 g of tetrahydrofuran (THF). 17.5 g of an $\alpha,\omega$-trimethylsilyl-terminated polydimethylsiloxane having a viscosity of 10 mPas, 11.7 g of butanediol dimethacrylate, and 1.4 g of $\alpha,\omega$-dimethoxy-$\omega$-phenyl-acetophenone are mixed in. The solution is poured into a PTFE mold with a depth of approximately 2 mm and the solvent is evaporated in the absence of light. This procedure is repeated until sheets 2 mm thick are obtained, from which test specimens are punched. Mechanical data for S2 rods are given in table 1.

One of the sheets produced is irradiated for 1 minute while a second sheet is irradiated for 5 minutes with the UV lamp described above. Mechanical data for S2 rods are given in table 1.

EXAMPLE 5

70 g of the pellets produced in example 1 are dissolved in 350 g of tetrahydrofuran (THF). 17.5 g of an α,ω-trimethylsilyl-terminated polydimethylsiloxane having a viscosity of 10 mPas, 11.7 g of dodecyl acrylate, and 1.4 g of α,ω-dimethoxy-ω-phenylacetophenone are mixed in. The solution is poured into a PTFE mold with a depth of approximately 2 mm and the solvent is evaporated in the absence of light. This procedure is repeated until sheets 2 mm thick are obtained, from which test specimens are punched. Mechanical data for S2 rods are given in table 1.

One of the sheets produced is irradiated for 1 minute while a second sheet is irradiated for 5 minutes with the UV lamp described above. Mechanical data for S2 rods are given in table 1.

TABLE 1

| Examples | Hardness [Shore A] | Tensile strength [MPa] | Elongation at break [%] | Stress at 100% elongation [MPa] |
|---|---|---|---|---|
| Example 3 unirradiated | 5 | 0.52 | 927 | 0.11 |
| Example 3 1 min UV lamp | 21 | 1.88 | 647 | 0.28 |
| Example 3 5 min UV lamp | 25 | 1.56 | 413 | 0.35 |
| Example 4 unirradiated | 3 | 0.19 | 1387 | 0.08 |
| Example 4 1 min UV lamp | 7 | 1.30 | 770 | 0.17 |
| Example 4 5 min UV lamp | 26 | 1.31 | 330 | 0.51 |
| Example 5 unirradiated | 10 | 0.75 | 868 | 0.16 |
| Example 5 1 min UV lamp | 14 | 1.58 | 569 | 0.28 |
| Example 5 5 min UV lamp | 20 | 1.49 | 373 | 0.41 |

The invention claimed is:

1. A radiation crosslinkable composition comprising copolymers of the formula $$R'-[(A)_a(B)_b(C)_c]-R''  \quad (I),$$

in which (A) are identical or different and have the formula (II)

—[CO—NH—Z—NH—CO—ND-Y—Si(OR$^1$)$_o$R$_{2-o}$—(O—SiR$_q$R$^5{}_{2-q}$)$_n$—O—Si(OR$^1$)$_o$R$_{2-o}$—Y—ND]—, (B) are identical or different and have the formula

—[CO—NH—Z—NH—CO—NR$^4$-G-NR$^4$]— (III), and (C) are identical or different and have the formula

—[CO—NH—Z—NH—CO-E-X-E]- (IV), where

X each individually is an alkylene radical having 1 to 700 carbon atoms optionally substituted by fluorine, chlorine, $C_1$-$C_6$ alkyl or $C_1$-$C_6$ alkyl ester, and in which non-adjacent methylene units are optionally replaced by groups —O—, —COO—, —OCO— or —OCOO—, or is an unsubstituted or substituted arylene radical having 6 to 22 carbon atoms, Y each individually is a divalent hydrocarbon radical which has 1 to 30 carbon atoms and in which non-adjacent methylene units are optionally replaced by groups —O—, or is the radical —(CH$_2$)$_3$—NH—SiR$_2$—(CH$_2$)$_3$—NH—, Z each individually is a divalent hydrocarbon radical which has 1 to 30 carbon atoms and is unsubstituted or substituted by fluorine or chlorine, D each individually is a hydrogen atom or a monovalent, unsubstituted or substituted hydrocarbon radical, E each individually is an oxygen atom or an amino group —ND-, R each individually is a monovalent hydrocarbon radical which has 1 to 20 carbon atoms and is unsubstituted or substituted by fluorine or chlorine, R$^1$ each individually is a hydrogen atom or a monovalent hydrocarbon radical which has 1 to 20 carbon atoms and is unsubstituted or substituted by fluorine, chlorine or organyloxy groups, or is —(C=O)—R or —N=CR$_2$, R$^4$ each individually is a radical of the formula —Z'-SiR$_p$(OR$^1$)$_{3-p}$ with Z' being as defined for Z and p being 0, 1 or 2, or is a hydrogen atom or a monovalent, unsubstituted or substituted hydrocarbon radical, R$^5$ each individually is a monovalent, unsubstituted or substituted hydrocarbon radical which is uninterrupted or is interrupted by oxygen atoms, and contains an aliphatic carbon-carbon multiple bond, G each individually is as defined for Z, R" is a hydrogen atom or a radical —CO—NH—Z—NCO, R' if R" is a hydrogen atom, is a radical HND-Y—Si(OR$^1$)$_o$R$_{2-o}$—(O—SiR$_q$R$^5{}_{2-q}$)$_n$—O—Si(OR$^1$)$_o$R$_{2-o}$—Y—ND-, HNR$^4$-G-NR$^4$— or HE-X-E-, and if R" is radical —CO—NH—Z—NCO, is a radical OCN—Z—NH—CO—ND-Y—Si(OR$^1$)$_o$R$_{2-o}$—(O—SiR$_q$R$^5{}_{2-q}$)$_n$—O—Si(OR$^1$)$_o$R$_{2-o}$—Y—ND-, OCN—Z—NH—CO—NR$^4$-G-NR$^4$— or OCN—Z—NH—CO-E-X-E-, n each individually is an integer from 1 to 4000, o each individually is 0, 1 or 2, q is 0, 1 or 2, a is an integer of at least 1, b is 0 or an integer of at least 1, c is 0 or an integer of at least 1, with the proviso that in the molecule there is at least one radical R$^5$, and the individual blocks (A), (B) and (C) are distributed in any sequence in the polymer.

ii) optionally, at least one crosslinker bearing ethylenic unsaturation, iii) a photopolymerization initiator, iv) optionally, one or more fillers, v) optionally, one or more adhesion promoters vi) optionally, one or more of plasticizers, stabilizers, antioxidants, flame retardants, light stabilizers, and pigments, vii) optionally, crosslinkable polymers different from (i), and viii) optionally, one or more polymerization inhibitors.

2. The crosslinkable composition of claim 1, comprising:
(i) at least one copolymer of the formula (I),
(ii) optionally, at least one crosslinker,
(iii) a photopolymerization initiator,
(iv) optionally, one or more fillers,
(v) optionally, one or more adhesion promoters,
(vi) optionally, one or more of plasticizers, stabilizers, antioxidants, flame retardants, light stabilizers, and pigments,
(vii) optionally, a crosslinkable polymer different from (i), and
(viii) a polymerization inhibitor.

3. The crosslinker composition of claim 1, wherein at least one crosslinker is selected from the group consisting of vinylsilanes, allylsilanes, olefins, and (meth)acrylates.

4. The crosslinkable composition of claim 1, wherein at least one crosslinker is selected from the group consisting of 2-(2-ethoxyethoxy)ethyl acrylate, 2-phenoxyethyl acrylate, caprolactone acrylate, cyclic trimethylolpropane formal acrylate, ethoxylated nonylphenol acrylate, isobornyl acrylate, isodecyl acrylate, lauryl acrylate, octyldecyl acrylate, stearyl acrylate, tetrahydrofurfuryl acrylate, tridecyl acrylate, 2-phenoxyethyl methacrylate, ethoxylated hydroxyethyl methacrylate, isobornyl methacrylate, lauryl methacrylate, methoxypolyethylene glycol(350) monomethacrylate, methoxypolyethylene glycol(550)monomethacrylate, polypropylene glycol monomethacrylate, stearyl methacrylate, tetrahydrofurfuryl methacrylate; 1,6-hexanediol diacrylate, alkoxylated diacrylates, alkoxylated hexanediol diacrylates, diethylene glycol diacrylate, dipropylene glycol diacrylate, ester diol diacrylate, ethoxylated bisphenol A diacrylates, polyethylene glycol(200) diacrylate, polyethylene glycol(400) diacrylate, polyethylene glycol(600) diacrylate, propoxylated neopentyl glycol diacrylate, tetraethylene glycol diacrylate, tricyclodecanedimethanol diacrylate, triethylene glycol diacrylate, tripropylene glycol diacrylate, 1,3-butylene glycol dimethacrylate, 1,4 butanediol dimethacrylate, 1,6-hexandiol dimethacrylate, diethylene glycol dimethacrylate, ethoxylated bisphenol A dimethacrylates, ethylene glycol dimethacrylate, polyethylene glycol(200) dimethacrylate, polyethylene glycol(400) dimethacrylate, polyethylene glycol(600) dimethacrylate, tetraethylene glycol dimethacrylate, triethylene glycol dimethacrylate; dipentaerythritol pentaacrylate, ditrimethylolpropane tetraacrylate, ethoxylated trimethylolpropane triacrylates, pentaerythritol tetraacrylate, pentaerythritol triacrylate, propoxylated glycerol triacrylates, propoxylated trimethylolpropane triacrylate, trimethylolpropane triacrylate, tris(2-hydroxyethyl)isocyanurate triacrylate, trimethylolpropane trimethacrylate; bisphenol A epoxyacrylate, epoxidized soybean oil acrylate, epoxy novolac acrylate oligomer, fatty acid-modified bisphenol A epoxyacrylate; aliphatic and aromatic urethane acrylates and polyester acrylates; silanes containing SiC-bonded vinyl, allyl, acryloyloxy, methacryloyloxy groups and also their partial hydrolyzates and cohydrolyzates; styrene, isoprene, butadiene and vinyl acetate.

5. The crosslinkable composition of claim 1, wherein $R^5$ is a vinyl radical.

6. The crosslinkable composition of claim 1, wherein a is an integer from 5 to 1000.

7. The crosslinkable composition of claim 5, wherein a is an integer from 5 to 100.

8. The crosslinkable composition of claim 1, wherein b is 0.

9. The crosslinkable composition of claim 1, wherein c is 0.

10. The crosslinkable composition of claim 1, wherein 1% to 20% of all the SiC-bonded radicals in the polymer of formula (I) are radicals $R^5$.

11. A crosslinkable composition comprising at least one copolymer of claim 1, and at least one di(meth)acrylate crosslinker, tri(meth)acrylate crosslinker, or mixture thereof.

12. The crosslinkable composition of claim 1, comprising:
(i) at least one copolymer of the formula (I),
(ii) at least one crosslinker,
(iii) a photopolymerization initiator,
(iv) optionally, one or more fillers,
(v) optionally, one or more adhesion promoters,
(vi) optionally, one or more of plasticizers, stabilizers, antioxidants, flame retardants, light stabilizers, and pigments,
(vii) optionally, a crosslinkable polymer different from (i), and
(viii) optionally, a polymerization inhibitor.

13. A molding produced by crosslinking the composition of claim 11.

* * * * *